Feb. 14, 1939. E. SIEGLING 2,147,465
BELT DRIVE
Filed Feb. 11, 1938
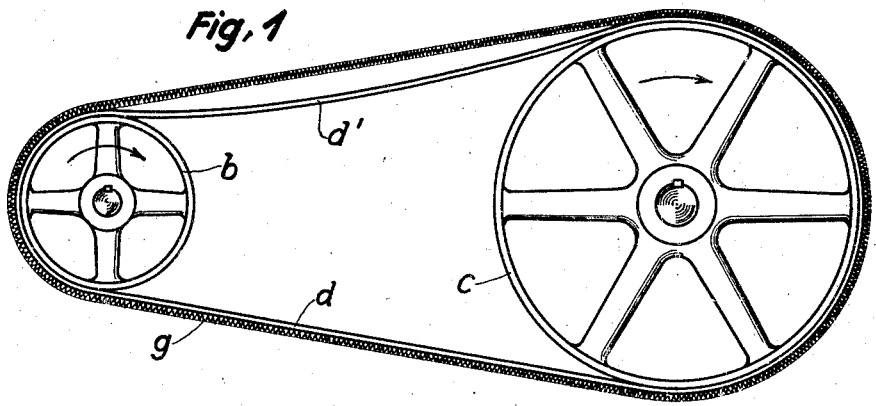
Fig. 1
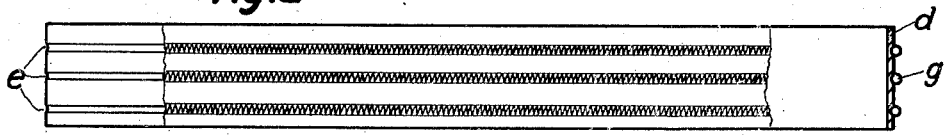
Fig. 2
 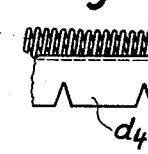 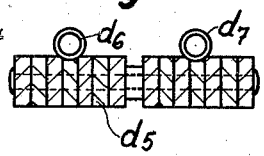 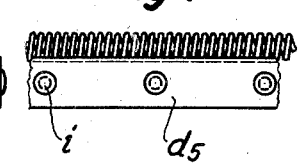
Fig. 4  Fig. 5  Fig. 6  Fig. 7
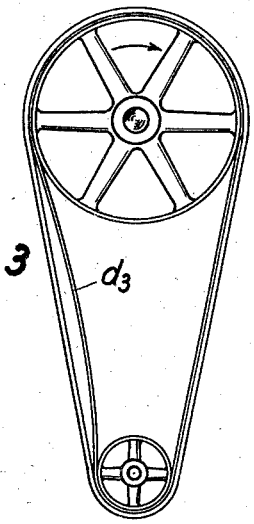
Fig. 3
Inventor: Ernst Siegling
by Karl Viertel
Attorney Patented Feb. 14, 1939

2,147,465

UNITED STATES PATENT OFFICE 2,147,465

BELT DRIVE

Ernst Siegling, Hanover, Germany

Application February 11, 1938, Serial No. 190,056
In Germany April 23, 1937

1 Claim. (Cl. 74—232)

My invention deals with problems presented by one of the oldest and simplest types of flexible power transmission devices known as and collectively called hereinafter belt drives, wherein an endless flexible member under tension such as a leather belt, band or the like, frictionally engaging a pair of pulleys at their peripheral faces transmits power between rotary shafts carrying said pulleys.

The invention relates more specifically to improvements in belt drives of the so-called open type and of various designs, including vertical, approximately vertical and horizontal open belt drives, the axes of the pulleys of which are substantially parallel to one another and are arranged either at widely different levels or at a relatively short distance from one another, so that the weight of the belt alone would not or not sufficiently tension the belt as required for doing its work properly and without slipping, and that artificial means must be applied for imparting the necessary initial tension to the belt, such as making a previously stretched leather belt still shorter than the length of the ordinary tape line tightly drawn over the pulleys concerned, or using tightening pulleys, idlers or the like.

The problems underlying this invention and the advantages obtained will be more fully understood by critically reviewing the shortcomings and disadvantages inherent to conventional belt drives of the open type specified above.

As a matter of fact widely known to practitioners in this field the belt of conventional belt drives of the open type described must be set under relatively high initial tension by artificial means as indicated in order to avoid slipping; said tension usually being so high, that the pressure of the rotary shafts carrying the respective pulleys upon their bearings in the direction of pull far exceeds the effective pull produced by the transmission of energy alone in the tight side of the belt.

In practice the normal pressure of the rotary shafts concerned upon their bearings, as caused by the necessary initial tension of the belt, is in horizontal belt drives on the average about three times that of the effective pull and considerably higher in inclined or vertical open belt drives.

Moreover new belts must be carefully proportioned as to their working length, namely so that after they have been previously stretched and have become still lengthened during a short trial service they are still tight enough for pulling through without slipping, which means that the pressure of the rotary shafts upon their bearings will exceed for some time even the figures indicated.

Because of the uncompromisingly high initial tension, to which the belt must be subjected in practice, relatively strong belts, of larger cross section, heavier in weight, and more expensive in their making and keeping in repair must be generally chosen than would be required by the energy alone to be transmitted; this is a serious drawback of open belt drives in general.

Other disadvantages connected with the former are the losses of energy caused by friction in the bearings of the rotary shafts, the conversion of the lost energy into heat and the great amount of attention and care required for supervising and keeping the said bearings in proper working condition.

The principal object of this invention is to overcome the said drawbacks by providing an improved belt drive of the type set forth and of simple design, wherein the maximum tension active in the belt is considerably smaller than with belt drives known and used heretofore, namely does not substantially exceed the effective pull produced by the transmission of energy, increased only by the intrinsic tension caused by the belt's own weight.

An important feature of the invention consists in that the improved belt drive can be used to advantage in extraordinary cases, where the center distance of the pulleys is very small, and (or) where the pulleys are arranged at widely different levels for instance directly above each other, and (or) greatly differ in their diameter.

Another equally important feature of the invention consists in that because of the absence of high initial tension in the belt as artificially produced heretofore, belts of relatively small cross section, lighter in weight and cheaper to make and keep in repair than those required heretofore for transmitting an equal amount of energy can be used to advantage.

Still another noteworthy feature characteristic of belt drives improved according to this invention consists in that a much smaller percentage of energy is lost by friction in the bearings and that the efficiency of the drive is correspondingly enhanced when compared with belt drives of the type known and used heretofore.

Further objects aimed at by the invention and advantages obtained will become incidentally apparent to practitioners in this field as the description proceeds.

The nature and scope of this invention are briefly outlined in the appended claim and will be more fully understood from the following specification taken together with the accompanying drawing, in which Fig. 1 is a side elevation diagrammatically showing a horizontal open belt drive designed according to this invention, Fig. 2 is a plan, partly in cross section of the belt drive shown in Fig. 1, Fig. 3 is a side elevation drawn in a smaller scale and showing a vertically arranged open belt drive designed according to this invention, Fig. 4 is a cross section through a belt of modified design as used in connection with belt drives designed according to this invention, Fig. 5 is a fragmentary side elevation of the belt shown in Fig. 4, Figs. 6 and 7 are a cross section and fragmentary side elevation respectively of another structurally modified belt as used for the purposes of this invention.

The horizontal belt drive designed with the objects in view stated above and shown by way of an example in Figs. 1 and 2 comprises:

(1) Two pulleys b, c of different diameter, having flat faces and a relatively small center distance, (2) An endless belt d of unusual length interengaging said pulleys b, c; in contradistinction to those shorter belts, which are required in short center and other belt drives of the type specified, and which are under high initial tension, requiring occasionally re-shortening and re-splicing, the belt d designed for the purposes of this invention, is considerably longer than the ordinary tape line drawn tightly over both pulleys b, c.

Because of its unusual specific length the belt d will under all conditions present a sagging portion d', whether working or being at rest.

A plurality of spaced recesses or grooves e are formed longitudinally on the outside of the belt d presenting guide tracks for (3) Endless extension springs g, preferably highly flexible helical springs, which longitudinally engage under initial tension the belt d, being in contact with the guide grooves e of the latter; said endless springs g although frictionally engaging the grooves e of the belt are free to gradually move or creep forward relatively to and independently of the belt d when the latter is in motion.

The required net length of said springs g in opened and unloaded condition may be conveniently determined by practical tests, namely by suspending therefrom balance weights commensurate to the calculated initial tension under which the said springs should be in their working position on the belt, to the predetermined total amount of friction required in the transmission of the energy, and to the pressure necessary for producing the requisite frictional contact at the working faces of the belt and pulleys.

In choosing springs for the purposes of this invention, in adjusting their length and tension and in determining the width of the belt it should be expressly noted, that in order to obtain the best results and gain all the economical and technical advantages aimed at by this invention indicated above, the belt proper is to be the very power transmitting member and should be capable of safely transmitting the effective pull, while the springs are subsidiary elements intended to relieve the belt proper from initial tension, namely to produce and maintain—instead of by the high initial tension heretofore artificially imparted to the belt proper—the necessary pressure and frictional contact between the belt and the pulleys.

Good results have been obtained with wire coil springs 10 mm. in diameter, made of steel wire 2 mm. thick, and having on duty an initial tension not exceeding 20 kg.; said springs were used in a vertical open belt drive diagrammatically shown in Fig. 3.

In the latter the most salient feature of the invention, namely the absence of initial tension in the belt $d3$ is clearly visible and in contrast to prior art belt drives in which the belt is obviously under considerable initial tension in both laps.

Belts of trapezoidal cross section $d4$ and loaded on their outside by springs $g4$ as shown by way of another example in Figs. 4 and 5 may be conveniently used according to this invention, for instance where the pulleys available in belt drives under re-construction are V-shaped or angularly grooved.

Various other changes and modifications may be conveniently made in the structural details of open belt drives of the improved design shown without departing from the spirit and the salient ideas of this invention.

Instead of flat or angular belts shown in Figs. 1-5 so-called edge laid belting consisting of a plurality of strips $d5$ all of the same width equal to the intended thickness of the belt, held together by bolts $i$ and loaded by springs $d6$, $d7$ may be used to advantage also in connection with convex or crowned pulleys as diagrammatically shown in Figs. 6 and 7.

What I claim is:

In a belt drive, the combination with a pair of spaced pulleys, one driving and the other driven, of a belt embracing both pulleys and of a length adapted to hang in slack position on one side of the pulleys during normal driving operation, said belt having in the outer face thereof, and extending therearound a constantly open groove for the reception of a pressing element operating under tension, and an endless flexible pressing member embracing both said pulleys and said belt, and being seated in said groove and retained therein solely by the groove and its own tension in the region of the pulleys and on the taut side of said belt, that portion of the belt on the slack side being longer than the pressing member on the same side of the pulleys, whereby the center portion of it between the pulleys separates from the pressing member.

ERNST SIEGLING.